United States Patent [19]

Houtz

[11] 4,456,311

[45] Jun. 26, 1984

[54] HYDRAULIC BRAKE CONTROL AND VALVE THEREFOR

[75] Inventor: Kenneth E. Houtz, Streamwood, Ill.

[73] Assignee: Dresser Industries, Inc., Dallas, Tex.

[21] Appl. No.: 363,192

[22] Filed: Mar. 29, 1982

[51] Int. Cl.³ .......................................... B60T 13/16
[52] U.S. Cl. .................................... 303/10; 303/71
[58] Field of Search ..................... 303/10, 11, 71, 13, 303/6 M; 188/170

[56] References Cited

U.S. PATENT DOCUMENTS 3,479,096 11/1969 Cruse ................................ 303/13 X
3,977,732 8/1976 Grosseau ......................... 303/13 X Primary Examiner—Bruce H. Stoner, Jr.
Assistant Examiner—Alvin Oberley
Attorney, Agent, or Firm—Barry E. Deutsch

[57] ABSTRACT

A brake control for a vehicle, especially a heavy work vehicle, having both service and emergency braking systems, each system having its own hydraulic actuator, having a fluid reservoir, a hydraulic pump and a manually actuable control valve wherein the control valve includes a variable pressure regulating portion having an inlet from the pump, an outlet to the service brakes and a spool controlling the outlet pressure to the service brakes. The control valve also has a three-way valve portion having an inlet from the pump and an outlet to the emergency brake actuators, preferably the pressure-release, spring-apply type, and an externally controlled valve stem with a wide groove which supplies pressure to the emergency brake actuators continually over much of its travel while operating the service brake portion through a compression spring disposed between the stem and the spool. Near the end of its travel, the three-way valve portion switches to connect the pressure outlet to the hydraulic reservoir allowing the springs to apply the emergency brakes. The control valve could have other uses than the braking system taught wherein the three-way valve switching occurs before the substantial stem travel portion during which the primary operation of regulating portion of the valve takes place.

9 Claims, 1 Drawing Figure

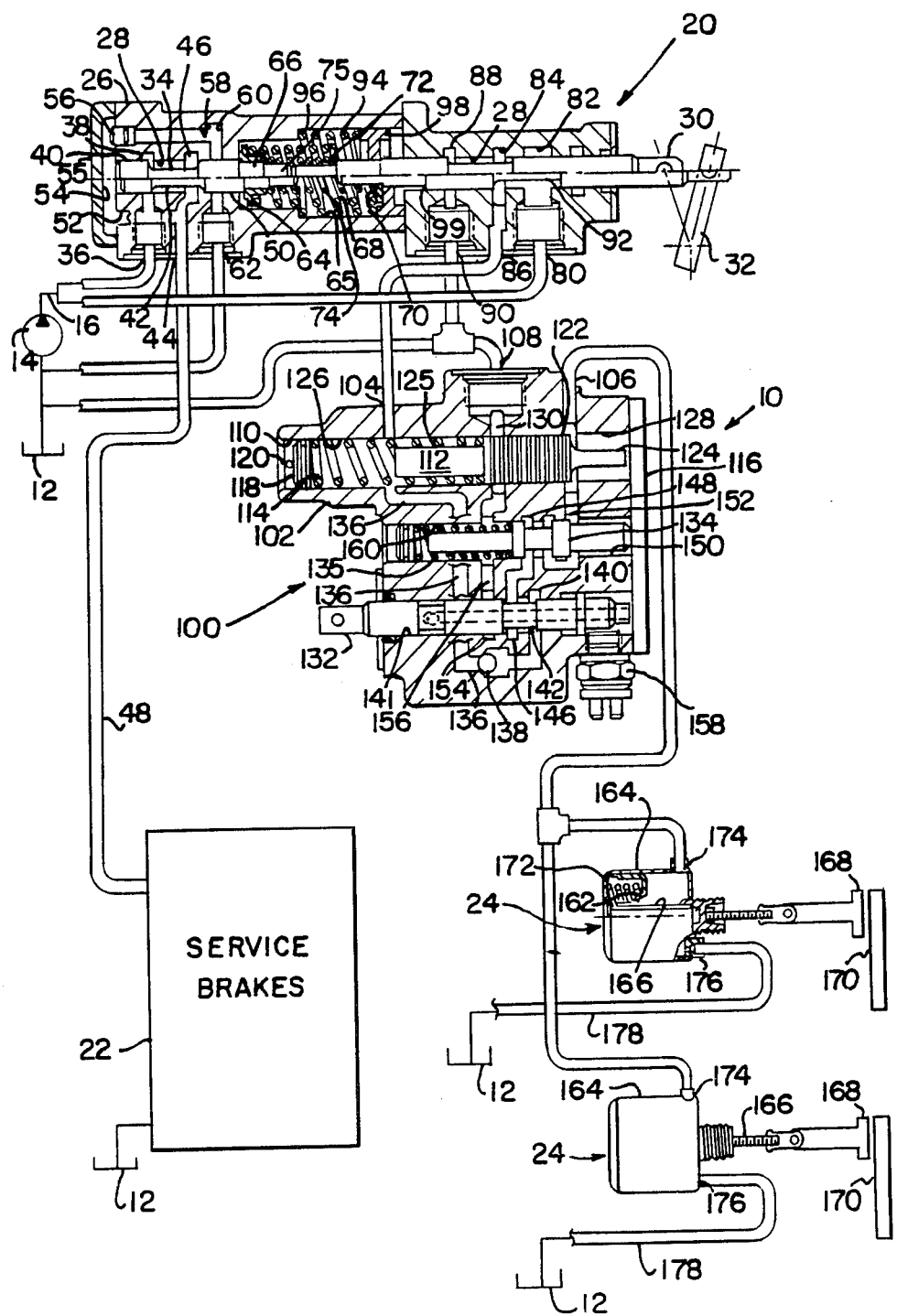

HYDRAULIC BRAKE CONTROL AND VALVE THEREFOR

CROSS-REFERENCE TO RELATED APPLICATION

This application is related to application Ser. No. 363,191 now U.S. Pat. No. 4,432,585 filed by Kenjiro Nezuka concurrently herewith and assigned to the assignee hereof.

BACKGROUND OF THE INVENTION

This invention is related to hydraulic braking systems for vehicles, especially heavy work vehicles, of the type having emergency brakes in addition to the service brakes used in normal operation and more particularly, to a hydraulic control valve for actuating both the emergency and service brakes systems.

A significant advantage of the invention is that both the service brakes and emergency brakes are actuated by the operator using the same brake pedal. Thus, in the event of a service brake failure, the operator attains the use of his emergency brakes by doing nothing more than his instinctive reaction to such an emergency—push the brake pedal harder. This probably also reduces reaction time since the operator need not reach for a separate control. Others have provided braking systems wherein a single brake pedal actuated both emergency and service brake systems. For example, U.S. Pat. Nos. 3,424,281, 3,463,276, and 3,926,282 illustrate such systems. Most of these require a loss of hydraulic pressure to the service brakes and/or overtravel of the brake pedal for the emergency brake to be actuated. However, hydraulic pressure loss is not the only way service brakes can fail.

SUMMARY OF THE INVENTION

Accordingly, it is a primary object of the invention to provide a control for a braking system including emergency and service brake actuators wherein the emergency brake actuator can be activated by the operator at will whether or not portions of the service brake system may still be operable.

Another primary object of the invention described and claimed is to provide a control valve for sequential actuation of two related functional elements operated by a single actuator.

A specific object of the invention is to provide a control valve having a manually variable pressure regulating portion coaxial with a three-way valve portion wherein substantial operation of the pressure regulating portion can be achieved through the stem of the three-way valve portion without affecting the state of the three-way valve portion while providing a change of state of the three-way valve portion at some point before, during or after the achievement of the operational goals of the variable pressure regulating portion.

A more specific object of the invention described herein is to provide a hydraulic braking system with a unique control valve having a service brake control portion and an emergency brake control portion wherein the stem of the emergency brake portion is operated for a substantial portion of its travel without actuating the emergency brakes while the movement of the stem operates the service brake portion.

The above and other objects of the invention are specifically met in a brake control for a vehicle, especially a heavy work vehicle, having both service and emergency braking systems, each system having its own hydraulic actuator, having a fluid reservoir, a hydraulic pump and a manually actuable control valve wherein the control valve includes a variable pressure regulating portion having an inlet from the pump, an outlet to the service brakes and a spool controlling the outlet pressure to the service brakes. The control valve also has a three-way valve portion having an inlet from the pump and an outlet to the emergency brake actuators, preferably the pressure-release, spring-apply type, and an externally controlled valve stem with a wide groove which supplies pressure to the emergency brake actuators continually over much of its travel while operating the service brake portion through a compression spring disposed between the stem and the spool. Near the end of its travel, the three-way valve portion switches to connect the pressure outlet to the hydraulic reservoir allowing the springs to apply the emergency brakes. The control valve could have other uses than the braking system taught wherein the three-way valve switching occurs before the substantial stem travel portion during which the primary operation of regulating portion of the valve takes place.

DESCRIPTION OF THE DRAWING

Other objects and advantages will become more apparent upon reading the following Description of the Preferred Embodiment and upon perusal of the drawing which is a schematic representation of a vehicle hydraulic braking circuit.

DESCRIPTION OF THE PREFERRED EMBODIMENT

It will be appreciated that in the ensuing description, certain terms such as "spool", and "stem" are utilized for the purpose of distinguishing various portions of the inventions from other portions of a similar nature. The difference in wording is not intended to imply a difference in structure except as may be indicated by the accompanying text.

Referring now to the drawing, there is shown schematically a hydraulically operated braking system 10 for a vehicle, such as a heavy work vehicle, including a hydraulic fluid reservoir 12, a hydraulic pump 14 drawing fluid from the reservoir and delivering it to conduit 16 at a regulated pressure, hereinafter referred to as system pressure, sufficiently high to fully actuate the service brakes or release the emergency brakes as the case may be. It will be appreciated that the output of the hydraulic pump 14 may also be used for other purposes than braking which are not taught or illustrated herein.

Hydraulic fluid at system pressure is delivered to two separate inlet ports of brake pilot control valve 20 which includes two portions, a variable pressure regulating portion which controls the pressure supplied to apply the vehicle service brakes schematically shown at 22, and a three-way valve portion which controls the emergency or parking brake actuators 24 to be described more completely hereinafter.

The brake pilot valve 20 includes a housing 26 having a central bore 28 which slidably receives a control stem 30 in one end, the stem being illustrated in the drawing in the extreme positions of travel on opposite sides of the center line, extending externally of the housing 26 to a distal end connected by linkage, a portion thereof being shown at 32, to a conventional foot pedal (not shown) in the operator's compartment of the vehicle.

At the other end of the central bore 28, in axial alignment with the control stem 30, is valve spool 34 which controls the application of the service brakes 22. To this end, the pilot valve housing 26 is provided with an inlet port 36 connected to the hydraulic pump 14, which intersects an annulus 38 formed in the central bore 28 near the left end thereof. A land 40 on the valve spool 34 acts in cooperation with the edge of the annulus 38 to throttle the inlet fluid into the annular groove 42 of the spool, thereby reducing its pressure, for delivery to outlet port 44, also intersecting the central bore 28 at annulus 46 and then through the conduit 48 connected to the outlet port and leading to the service brakes 22 which have a flow restricted outlet permitting a small amount of flow back to the reservoir 12.

A second land 50 on the valve spool 34 fits in the central bore 28 to the right of the output annulus 46 and seals off the pressure annulus 46 from the spring cavity 65 of the valve housing 26. An internal conduit 52 in the valve housing conducts the output pressure from the output annulus 46 to a chamber 54 formed on the end of the valve housing 26 by a cap 55 and exposed to the end of the valve spool thereby eliminating any pressure differential across the land 40. Outlet pressure is further conducted and reduced through a small orifice 56 and internal conduit 58 to annulus 60 disposed about the valve spool land 50 to pick up leakage and then out port 62 and back to the reservoir 12. The above arrangement assures a small amount of continuous flow through the pilot valve passages to prevent the hydraulic fluid from congealing in cold operating conditions.

A land 64 of slightly smaller diameter than the land 50 is formed on the valve spool 34 adjacent the two and extends into the cavity 65 existing in the housing 26 between the stem 30 and spool 34 whereat it receives an annular spring retainer 66 which abuts against the end of the land 50. A brake pressure control spring 68 is seated on the spring retainer 66 and extends axially of the valve spool 34 and control stem 30 to an annular spring retainer washer 70 mounted on the control stem 30, its axial position there being fixed by shoulder 72 on the stem and a snap ring. In addition to the brake pressure spring 68, an inner low pressure spring 74 also extends axially between the retainer washer 70 on the control stem and the shoulder formed by the end of the small land 64 and the end stem 75 on the valve spool 34.

The operation of the service brake end of the brake pilot valve 20 is as follows. With the hydraulic pump 14 presenting system pressure to the inlet 36 and the control stem 30 in its rightmost position, corresponding to the operator not touching the brake pedal, only the inner spring 74 is exerting a force on the spool 34, the brake pressure spring 68 being in a free length state. Since the pressure on the land 40 of the spool is the same on both sides, the spring 74 pushes the spool leftward in the bore 28 allowing fluid to throttle past the edge of the land 40 into the output annulus 46. An equilibrium position is reached when the force on the left side of land 50 due to the outlet pressure equals the force imposed on the spool by the spring 74. The low pressure caused by spring 74 insures a small amount of flow through both the pilot valve 20 and the service brakes 22 back to the reservoir 12 to keep the system warm and ready to respond, the pressure regulated by the spring 74 being insufficient to actuate the service brakes 22. Upon the operator depressing the brake pedal (not shown) and moving the control stem 30 to the left, the pressure spring 68 becomes compressed by the retainer washer 70 proportionate to the degree of travel of the control stem and brake pedal. The inner spring 74 is also compressed. Accordingly, the valve spool 34 moves to the left reducing the throttling past the land 40 and therefore increasing the outlet pressure until equilibrium is again reached with the outlet pressure to the service brakes 22 acting against the land 50 and balancing the springs 68 and 74. Thus, service braking proportional to the operator's actuation of the brake pedal occurs until the spring retainer 66 contacts the wall of the cavity which limits the maximum pressure introduced to the service brakes 22.

The right end of the brake pilot valve 20 constitutes the three-way valve for emergency braking control. To this end, the valve housing 26 has a second pressure inlet 80 exposed to system pressure from the hydraulic pump 14, which inlet intersects the central bore 28 in an input annulus 82. Adjacent the input annulus 82, the central bore 28 is provided with a pressure output annulus 84 leading to pressure outlet port 86 for supplying pressure to release the pressure-release, spring-apply emergency brake actuators 24. A dumping annulus 88 is provided in the bore 28 adjacent the pressure annulus 84 on the side opposite the input annulus 82, dumping annulus 88 being connected through dump outlet 90 and suitable conduits to the hydraulic reservoir 12. The control stem 30, which slideably fits in the bore 28 in hydraulic sealing relation, is provided with an annular groove 92 positioned to permit continuous communication between the pressure input annulus 82 and the pressure outlet annulus 84 when the control stem is in its rightmost position, the groove 92 having sufficient axial length relative to the spacing of the annuli 82,84 to maintain the communication therebetween over a substantial length of travel of the control stem 30 corresponding to normal operation of the variable pressure regulating portion of the valve 20 which operates the service brakes 22 of the vehicle as explained above. The dumping annulus 88 is positioned in the bore 28 such that when the stem 30 moves to the left and closes off the input annulus 82 from the groove 92, communication between the pressure outlet annulus 84 and the dumping outlet annulus 88 is then achieved through the groove 92. Thus, the right end of the brake pilot valve 20 functions as an on-off directional control valve which continuously provides pressure to the pressure-release emergency brake system when the control stem is not actuated, or is only actuated for normal braking operations, but which dumps the pressure in the pressure outlet 86 back to the reservoir 12 when the control stem 30 is moved leftwardly beyond the normal braking range of travel thus causing the emergency brakes to be applied at the same time and with the same pedal control as the service brakes 22.

To give the operator a tactile warning that his emergency brakes are about to be applied, an additional compression spring 94 is disposed in the valve housing 26 being seated against an internal shoulder 96 in the cavity 65 which engages a spring retainer 98 slideably mounted on the control stem 30 but normally engaging the axial end wall of the interior cavity 65. The control stem 30 is provided with a shoulder 99 disposed to engage the spring retainer 98 as the control stem moves leftwardly just before communication between the input annulus 82 and pressure outlet annulus 84 is broken. At this point, the pedal force is increased by at least 50 percent, immediately warning the operator of the impending engagement of the emergency brakes.

The dump valve assembly 100 comprises a housing 102 having a pressure inlet port 104 communicating with the pressure outlet 86 of the pilot valve 20, a pressure outlet port 106 conmunicating with the brake actuators 24, and a dump outlet 108 communicating with the hydraulic reservoir 12. The dump valve housing 102 further includes a first dumping and accumulating bore 110 containing a sliding valve spool 112 biased by regulating spring 114 on the left end of the spool 112 toward engagement with the right end of the bore which is sealed by end plate 116. The spring 114 is preloaded by plug 118 which also seals the left end of the bore 110 being retained therein as by roll pin 120. The valve spool 112 has a relatively wide land 122, an elongated stem 124 on the right end for engaging the end plate 116, and an elongated stem 125 on the left end for piloting the spring 114 and for stopping the spool against plug 118. The input port 104 intersects the valve bore 110 in the spring cavity 126 and is continuously open thereto. The pressure outlet port 106 intersects the bore 110 in the pressure cavity 128 at the right end of the spool and is continuously open since the elongated stem 124 on the spool 112 prevents the land 122 from closing it. The dump outlet 108 also intersects the bore 110 in an annulus 130 normally closed off from the bore 110 by the spool land 122.

An internal conduit means in the valve housing 102 provides a continuous flow path during normal operation of the vehicle from the spring cavity 126 to the pressure cavity 128 so long as the input port 104 is pressurized, the conduit means having a reverse flow preventing means. The conduit means which is more elaborate in the drawing due to the parking switch spool 132 and the pressure reducing spool 134, comprises an internal passage 136 intersecting the bore 110 at the spring cavity 126 and extending downwardly to a reverse flow check valve 138 and then to annulus 140 of parking switch bore 141 containing the spool 132. With the parking switch in the operating position, fluid is transferred through groove 142 on the spool 132 to annulus 146 which communicates with annulus 148 in the pressure reducing bore 150 containing pressure reducing valve spool 134 which is baised by spring 135 to permit the flow from its output annulus 152 at a lower pressure than system pressure corresponding to the maximum pressure limits of the brake actuators 24. The output annulus 152 of the pressure reducing valve opens to the pressure cavity 128.

It can be seen that the parking switch bore 141 is provided with a second annulus 154 communicating through internal conduit 156 in the housing 102 with the dump outlet 108. Thus if the parking spool 132 is moved to the left, the annuli 146,154 communicate through the spool groove 142 and all pressure to the brake actuators is relieved thereby maintaining the brakes 24 in a locked condition for parking whether or not the vehicle engine and pump are operating. The parking spool is operated manually and an electrical detent switch 158 interacts with the end of the spool to warn the operator that he is in the parking switch-off condition. It can also be seen that the spring cavity 160 of the pressure reducing spool 134 also communicates through the conduit 156 to the dump outlet 108 and reservoir 12. Thus, the pressure in the output annulus 152 of the pressure reducing valve directly corresponds to the load imposed by the spring 135.

The spring-apply, pressure-release emergency brake actuators 24 are a commercially available brake cannister used with hydraulic fluid here, which comprise a piston 162 commonly used in highway truck air brake systems, although slideably mounted in a housing 164 sealed at one end to form a hydraulic cylinder and ventilated at the other. A central rod 166 extends axially from a connection with the piston 162 through bottom of the sealed side of the housing and through suitable seals therein to a disc brake pad 168 positioned to engage a disc 170 mounted against rotation to the vehicle wheel (not shown). A heavy compression spring 172 is disposed on the ventilated side of the piston 162. In the absence of hydraulic pressure at the inlet 174 to the hydraulic cylinder side of the housing which is connected in parallel with the inlet 174 of the other brake actuator 24 to the pressure outlet 106 of the dump valve, the springs 172 provide the complete force engaging the brake pad 168 and the disc 170. Each housing is also provided on its hydraulic side with a flow restricted outlet in the form of a fixed orifice 176 which is connected by conduit 178 to the hydraulic reservoir 12.

In operation, when the control stem 30 is in the normal rightmost position or in the normal braking range of travel as described above, system pressure is supplied to the inlet 104 of dump valve 100 forcing the spool to the right against its stop, the pressure cavity 128 being at a lower pressure, and the system pressure is communicated through the conduit means 136, past the check valve 138, through the parking switch annuluses 140,146, through the pressure reducing valve 134 and outlet annulus 152 to the pressure cavity 128 and then out the pressure outlet 106 to the brake actuators 24 whereat the pistons are forced to the left against and overcoming the actuating springs 172 thereby pulling the brake pads 168 away from the discs 170. Since pressure is continuously available, the orifices 176 have no effect except to maintain a constant small flow through the system keeping the fluid from congealing in cold conditions, the latter being the primary reason for the specific location of the orifices 176 in the brake housings. Otherwise they could be anywhere on the pressure cavity side downstream of check valve 138.

When the operator depresses his brake pedal beyond the normal braking travel, the pressure in the inlet port 104 of the dump valve 100 is vented to the reservoir 12 through the pilot valve outlet 90. Since the pressure in the pressure cavity 128 immediately exceeds the pressure in the spring cavity 126 which is now zero, check valve 138 closes and the spool 112 is forced to the left overcoming spring 114 and opening the annulus 130 and dump port 108 to the pressure cavity 128, thereby immediately dropping the pressure therein to the value determined by the spring 114. This is ideally slightly lower than that at which the brake apply springs 172 overcome the piston 162 to the extent of taking up the clearance and actually begin engaging the brake pads 168 and discs 170. When this predetermined pressure is reached, the spring 114 moves the valve spool 112 to the right closing off the dumping annulus 130. Then, the pressure in the pressure cavity 128 and the brake actuators 24 begins to gradually decay as fluid returns to the reservoir 12 through the orifices 176 in the brake actuators 24. The rate of decay is also influenced by the spring 114 forcing the valve spool 112 toward the end plate 116 and causing a reduction of volume of the pressure cavity 128 as well as by the orifice size. This gradual pressure decay provides a corresponding gradual increase in the amount of braking force applied by the springs 172 to brake discs and wheels. When the stem 124 of the valve spool contacts the end plate 116, there is no more corresponding reduction in system volume to correspond to the volume of fluid escaping through the orifices 176 (the brake canister pistons 162 being almost motionless after engagement of the pad and disc) and the pressure drops to zero with the emergency brakes totally engaged.

Although the foregoing seems to be a long time to get the brakes engaged in an emergency situation, with proper sizing the above sequence can occur in about one to one and a half seconds or less without undue shock loads being imposed on the operator. Moreover, since the operator has but to apply more pressure to his service brake pedal to engage the emergency brakes, his reaction time in activating the emergency brakes should be substantially reduced compared to the time to locate and activate some other emergency braking device.

Thus, there has been described in accordance with the invention a brake control and valve system which fully meets the objects, aims and advantages set forth above. While the invention has been described in connection with a preferred embodiment thereof, it will be apparent to those of ordinary skill in the art that several alternatives and modifications can be made without departing from the true scope of the invention. For example, although taught in the context of a vehicle having separate emergency and service braking members, the invention could be utilized in a system having separate actuators for the same brake means. Accordingly, it is intended to claim all such alternatives and modifications as fall within the spirit of the appended claims.

What is claimed is:

1. A brake control system for a vehicle, said vehicle having service and emergency brake systems comprising:
   a fluid reservoir;
   a hydraulic pump drawing fluid from said reservoir;
   a first hydraulic actuating means operatively associated with said service brakes system;
   a second hydraulic actuating means operatively associated with said emergency brake system;
   an externally actuable control valve including a variable pressure regulating portion having an inlet hydraulically connected to said hydraulic pump, a pressure outlet hydraulically connected to said service brake actuating means, and a spool controlling the pressure in said outlet; an externally controlled three-way valve portion having a control stem in axial alignment with said spool, an inlet hydraulically connected to said hydraulic pump, a pressure outlet hydraulically connected to said emergency brake means; and compression spring means disposed in said control valve between said stem and said spool such that external actuation of said stem loads said spool through said spring means, said three-way valve portion being configured to permit substantial travel of said stem for actuating said spool and said service brakes without effecting a change in state of said three-way valve portion and to subsequently switch said three-way valve portion to apply said emergency brake system, said emergency brake actuating means being configured to release said emergency brakes upon the application of hydraulic pressure thereto and apply said brakes in the absence of such pressure, said control valve three-way portion having an outlet to said reservoir, said three-way valve portion being normally disposed to provide a hydraulic connection through said stem between said inlet and said pressure outlet and, upon movement of said stem beyond said substantial travel, said three-way valve pressure outlet and said reservoir outlet are hydraulically interconnected through said stem.

2. The invention in accordance with claim 1 and a warning spring disposed about said stem within said control valve housing and disposed to become compressed by said stem at the end of said substantial travel thereof.

3. The invention in accordance with claim 2 and said warning spring, upon being compressed, increasing the force resisting movement of said stem by at least fifty percent.

4. The invention in accordance with claim 1 and said compression spring means comprising a first spring continuously compressed by said stem and disposed to move said spool to provide a small amount of continuous flow to said service brakes from said variable pressure regulating portion, at a pressure below that required to actuate said service brakes, when said stem is not externally actuated and a second spring in a free length state when said stem is not externally actuated and disposed to exert substantial force on said spool upon movement of said stem.

5. The invention in accordance with claim 1 or claim 4 and said stem being connected to an operator actuated linkage.

6. A hydraulic control valve for sequentially controlling a plurality of related functions comprising:
   a valve housing having first and second sections and a cavity disposed therebetween, said sections having aligned central bores, said first valve housing section having a pressure inlet port intersecting said central bore in an annulus thereabout, a pressure outlet intersecting said central bore in an annulus adjacent said input annulus, a chamber at the end of said central bore, and internal conduiting establishing communication between said pressure outlet and said end chamber; said second section of said valve housing having three adjacent annuli intersecting said control bore, each annulus communicating with an external port in said housing;
   a valve spool slidingly disposed in the central bore of said first housing section, said spool having lands preventing communication respectively between said pressure inlet annulus and said end chamber and between said outlet annulus and said housing cavity and a groove disposed between said lands for establishing selective communication between said input annulus and said outlet annulus responsive to loads imposed on said spool;
   a valve stem slidably disposed in the central bore of said second housing section and extending axially outwardly of said housing thereof to a distal external control end, said valve stem having a wide groove for maintaining exclusive communication through said groove between the middle of said three annuli and one of the other two annuli for a substantial length of travel of said stem and for establishing communication between the middle of said three annuli and the other of said other two annuli at some point in the travel of said stem; and
   compression spring means disposed in said cavity between said spool and said stem, such that movement of said stem toward said spool causes said spool to move and establish communication between said first section inlet and pressure outlet ports wherein the pressure in said outlet port is proportional to the load imposed on said spring by said stem.

7. The invention in accordance with claim 6 and a warning spring disposed in said cavity and said stem having means disposed thereon to compress said spring when said stem switches communication of said middle annulus from one of the adjacent annuli to the other.

8. The invention in accordance with claim 6 or claim 7 and said spring means including a first spring continually biasing said spool to a position establishing slight communication between said pressure inlet and said pressure outlet in the absence of external loading of said stem, and a second spring disposed in a free state in said cavity in the absence of external loading of said valve stem and disposed to substantially load said spool upon external loading of said stem.

9. The invention in accordance with claim 6 or claim 7 and a spring retainer having a periphery larger than said central bore on said valve spool within said cavity, said spring retainer being engaged by said compression spring means and being disposed axially thereon to contact said cavity wall after a predetermined travel of said spool thereby limiting the maximum pressure in said pressure outlet.

* * * * *